United States Patent
Muto et al.

(10) Patent No.: US 9,481,402 B1
(45) Date of Patent: Nov. 1, 2016

(54) METHODS AND APPARATUS FOR SUPPORTING VEHICLE COMPONENTS

(71) Applicant: Honda Motor Co., Ltd., Tokyo (JP)

(72) Inventors: Noriyuki Muto, Columbus, OH (US); Robert T. Wilson, III, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 14/721,764

(22) Filed: May 26, 2015

(51) Int. Cl.
  *B62D 25/08* (2006.01)
  *B62D 33/023* (2006.01)
  *B60Q 1/30* (2006.01)
  *B62D 65/16* (2006.01)

(52) U.S. Cl.
  CPC ............. *B62D 33/023* (2013.01); *B60Q 1/307* (2013.01); *B62D 25/087* (2013.01); *B62D 65/16* (2013.01)

(58) Field of Classification Search
  CPC .. B62D 33/023; B62D 25/087; B62D 65/16; B60Q 1/307
  See application file for complete search history.

(56) References Cited

U.S. PATENT DOCUMENTS

| | | | |
|---|---|---|---|
| 2,649,308 A | * | 8/1953 | Bice, Jr. .................. B60R 3/00 280/164.1 |
| 4,500,101 A | | 2/1985 | Aoki |
| 4,535,869 A | | 8/1985 | Tsutsumikoshi et al. |
| 4,973,102 A | | 11/1990 | Bien |
| 5,429,412 A | | 7/1995 | Schoen et al. |
| 6,334,645 B1 | | 1/2002 | Ban |
| 6,695,367 B1 | | 2/2004 | Shymkiw |
| 6,846,038 B1 | | 1/2005 | White et al. |
| 6,874,590 B2 | | 4/2005 | Rondeau et al. |
| 7,036,837 B1 | | 5/2006 | Bauer et al. |
| 7,097,207 B2 | | 8/2006 | Kudo et al. |
| 7,331,593 B2 | | 2/2008 | Okabe et al. |
| 7,488,032 B2 | | 2/2009 | Thakar et al. |
| 7,523,981 B2 | | 4/2009 | Karube et al. |
| 7,530,629 B2 | | 5/2009 | King et al. |
| 7,669,678 B2 | | 3/2010 | Benedict et al. |
| 8,596,713 B1 | | 12/2013 | Lee |
| 2001/0038219 A1 | * | 11/2001 | Clare ..................... B60R 11/06 296/37.6 |
| 2012/0031688 A1 | * | 2/2012 | Safranski ................ B60G 3/14 180/54.1 |
| 2014/0167452 A1 | | 6/2014 | Nakagawa et al. |

* cited by examiner

*Primary Examiner* — Lori L Lyjak
(74) *Attorney, Agent, or Firm* — Kenealy Vaidya LLP

(57) ABSTRACT

Some embodiments are directed to a vehicle bed system for use with a vehicle that includes a cargo compartment, a tail light, a tail light cover, and a fender. The vehicle bed system can include a bed bottom that defines a bottom surface of the vehicle cargo compartment, and a pair of bed sidewalls that are disposed at opposite sides of the bed bottom. Connectors can directly connect each of the fender, tail light, and tail light cover to one of the bed sidewalls.

18 Claims, 6 Drawing Sheets

METHODS AND APPARATUS FOR SUPPORTING VEHICLE COMPONENTS

BACKGROUND

The disclosed subject matter relates to methods and apparatus for supporting or otherwise connecting vehicle components, including but not limited to components that are exposed to a vehicle exterior. More particularly, the disclosed subject matter relates to supporting vehicle components disposed at front or rear ends of a vehicle's exterior, such as a vehicle's light(s) (e.g., headlights, tail lights), fender, etc.

Many complicated and semi-complicated mechanical and electro-mechanical apparatus constitute an assembly of multiple separate components. For example, vehicles, including but not limited to vehicles that travel over land, water, air, etc., typically include many different components that are attached together via different technologies, such as mechanical fasteners, welding, glue and epoxy, etc. Some of these components can be located at or adjacent the vehicle's front and/or rear ends, such as headlights, tail lights, fenders, etc., and these components can be attached to the vehicle in a manner so as to constrain their motion relative to other vehicle components, and/or to achieve other operational or functional purposes. For example, a fender can be attached in a manner to impede the travel of debris, lights to alert pedestrians or other vehicles as to the vehicle's position, intended motion, etc.

SUMMARY

Fenders, tail lights, etc. can be mounted to a metallic vehicle frame via a pipe fixture, harness, bracket, etc. as well as nuts, bolts, etc. The pipe fixture/harness/bracket and the nuts/bolts may be metallic so as to form a secure connection to the metallic frame. Using the metallic nuts and bolts may require a technician to access both the front and rear of the assembly surface during vehicle construction, which can increase the cost and complexity of the assembly process, involve inconvenient techniques, etc.

For example, the technician mounts the various exterior components while accessing both sides of the vehicle's assembly surface. Mounting the rear fender and tail lights may require the technician to provide mounting assembly brackets, nuts and bolts, etc. to both the front and the rear of the assembly surface, and thus the technician needs to access the surface from under the vehicle. Alternatively, this process requires an additional step of removing and then replacing a body panel to form the mating connection (i.e., connecting the nut to the bolt).

This attachment technique requires the addition of multiple components, adding to the vehicle's part count, increasing complexity, etc., and may have an adverse impact on the time required to train technicians responsible for the assembly process. Use of these metallic components may also add to the vehicle's weight, which may negatively impact fuel consumption, transportation costs, tire wear, carbon footprint, etc.

Some or all of these issues may be especially relevant or poignant in the context of certain types of vehicles, such as all-terrain vehicles (ATVs), recreational off-highway vehicles (ROHVs), dune buggies, etc. These types of vehicles may travel across unpredictable terrain and thereby sustain relatively heavy strains to the rear assembly (including the rear fender and tail lights). Reducing the weight of these vehicles may also enhance fuel efficiency, which may be especially relevant to satisfy budget constraints and logistical fueling issues, i.e., these vehicles are more likely to be used to traverse terrain in remote or isolated environments with few accessible fueling stations. In addition, the cost of shipping such vehicles is increased in proportion to the weight of the vehicle. It may also be desirable to limit the greenhouse emissions of such vehicles, such as to comply with more restrictive environmental policies.

It may therefore be beneficial to address at least one of the above issues, such as by simplifying the assembly process, reducing the vehicle weight, etc. Some of these embodiments simplify the assembly process by attaching the fender, tail lights, etc. directly to a bed of the vehicle, instead of to the vehicle frame. Some of these embodiments perform this weight reduction by reducing the weight of the vehicle bed and/or the connectors used to attach the tail lights, fender, etc. to the vehicle bed. Various of the embodiments address the above issues while also sufficiently supporting the fender, tail lights, etc., as well as also maintaining the vehicle's styling image and mud/dust protection performance.

Thus, some of the embodiments do not utilize a metal bracket/pipe assembly to connect the fender, tail lights, etc. to the vehicle frame. Instead, some embodiments include sufficiently strengthened, rigid, relatively light weight, and/or non-metal plastic connector(s) to connect the fender, tail lights, etc. to the bed. Some of these embodiments also form the bed from synthetic resin (plastic), which is sufficiently sturdy to support at least the rear fender, tail lights, etc. Some of these embodiments achieve this enhanced sturdiness by forming the vehicle bed structure to include at least one raised contour that increases bed strength and thereby enables support of the vehicle components identified above.

In some of these embodiments, a rigid male plastic connector is inserted into a mating cavity of the bed, thereby obviating a metallic nut and bolt, pipe, and/or metallic bracket assembly that would connect to the vehicle frame. In some of these embodiments, this connector is aligned with an insulating rubber socket, allowing the connector to have a certain degree of motion relative to the vehicle. This connector may also be integrally or unitarily formed with other vehicle components.

Some embodiments are therefore directed to a vehicle bed system for use with a vehicle that includes a cargo compartment, a tail light, a tail light cover, and a fender. The vehicle bed system can include a bed bottom that defines a bottom surface of the vehicle cargo compartment, and a pair of bed sidewalls that are disposed at opposite sides of the bed bottom. Connectors can directly connect each of the fender, tail light, and tail light cover to one of the bed sidewalls.

Some other embodiments are directed to a vehicle assembly for use with a vehicle that includes a cargo compartment. The vehicle assembly can include an assembly of vehicle components that are exposed to an exterior of the vehicle, the assembly of vehicle components including a tail light, a tail light cover, and a fender. The vehicle assembly can also include a bed bottom that defines a bottom surface of the vehicle cargo compartment, a pair of bed sidewalls that are disposed at opposite sides of the bed bottom, and connectors that directly connect each of the fender, tail light, and tail light cover to one of the bed sidewalls.

Still other embodiments are directed to a method of assembling a vehicle bed system for use with a vehicle that includes a cargo compartment, a tail light, a tail light cover, and a fender. The method can include: defining a bottom surface of the vehicle cargo compartment with a bed bottom;

disposing a pair of bed sidewalls at opposite sides of the bed bottom; and directly connecting each of the fender, tail light, and tail light cover to one of the bed sidewalls.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
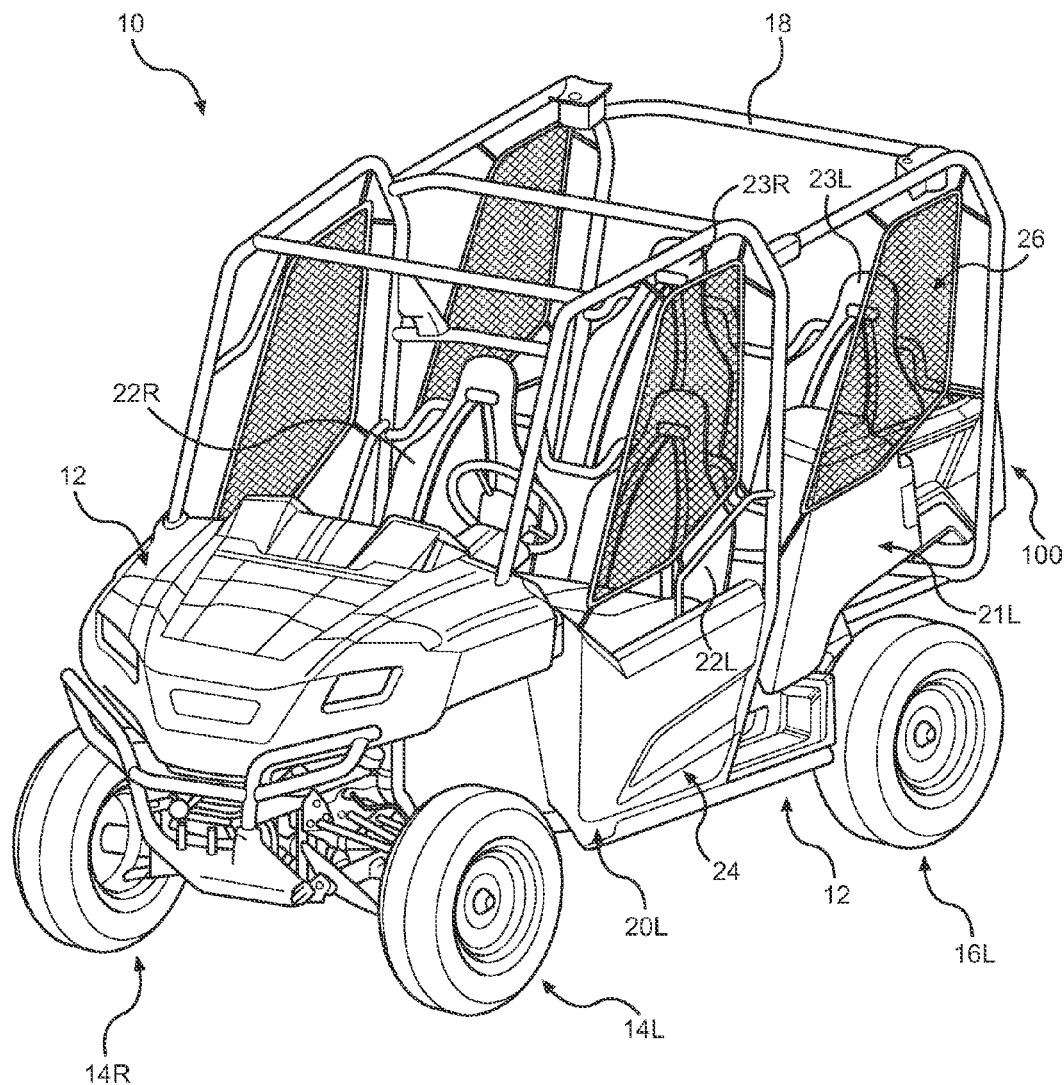
FIG. 1 is a perspective view of an exemplary vehicle in accordance with the disclosed subject matter.
Figure 2:
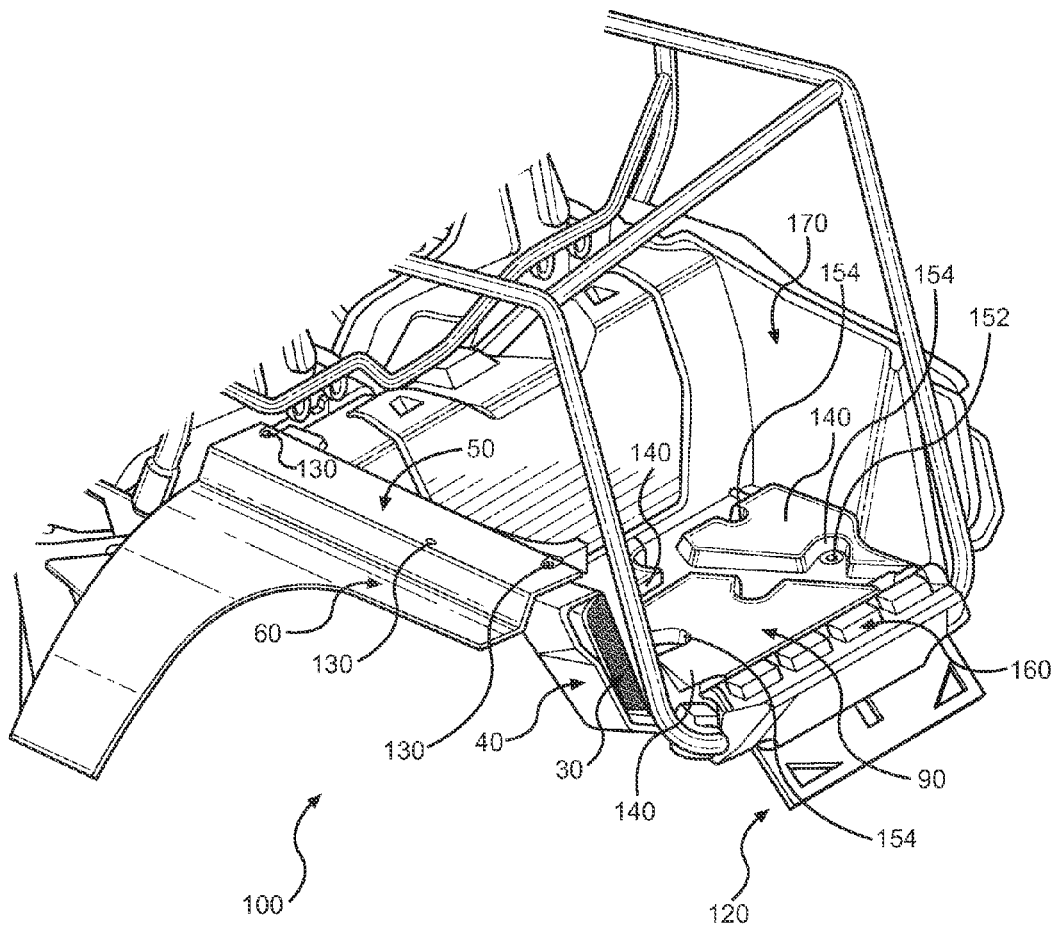
FIG. 2 is a perspective view of an alternative exemplary vehicle in accordance with the disclosed subject matter, which includes two seats as opposed to the four seats of FIG. 1.

FIG. 1 is a perspective view of an exemplary vehicle in accordance with the disclosed subject matter. The vehicle 10 shown in FIG. 1 can include a body 12, a pair of front wheels 14L, 14R, a pair of rear wheels 16L (the right-side rear wheel being obstructed from view), a roll cage 18, a pair of front door assemblies 20L (the right-side front door assembly being obstructed from view), a pair of rear door assemblies 21L (the right-side rear door assembly being obstructed from view), a frame assembly, and a powertrain. The vehicle 10 may also include a tail assembly 100. The frame assembly is hidden from view in FIG. 1 by the body 12 (but portions of a frame of an alternative embodiment are shown in FIG. 2), and the powertrain is omitted from FIG. 1 for simplicity and clarity of the drawing.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly to define a pair of door openings through which a passenger may pass in order to enter or exit the passenger area.

The door assemblies 20L, 21L each can include a door 24 and window panel assembly 26, and can be configured to selectively open and close access through the door openings by moving between a closed position and a fully opened position. In the closed position, the door assemblies 20L, 21L can span the respective door openings to obstruct access to the passenger area via the door openings. In the closed position, the front portion of each door assembly 20L, 21L can be latched to the roll cage 18. The fully opened position can be any position where the door assemblies 20L, 21L are pivoted away from the respective door openings to provide substantially unobstructed access to the passenger area via the door openings. FIG. 1 shows the door assemblies 20L, 21L in the closed position.

The vehicle 10 shown in FIG. 1 is specialized for use on an unimproved path or an unmarked path, and may be referred to as a multipurpose utility vehicle (MUV) or as a side-by-side all-terrain vehicle (SxS, SxS all-terrain vehicle—ATV, ATV, or recreational off-highway vehicle—ROHV). However, the disclosed methods and apparatus can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle (ROHV), etc. In fact, some embodiments can be used with still further types of vehicles, such as vehicles configured for travel through water, air, etc. Still further, some embodiments can be configured for use in non-vehicular applications, such as for amusement park rides, playground apparatuses, or any other situation where the disclosed methods and apparatus for supporting an assembly that is exposed to the exterior can enhance weight reduction, reduce manufacturing complexity and cost, etc.

II. Exemplary Tail Assembly

FIG. 2 is a perspective view of an alternative exemplary vehicle in accordance with the disclosed subject matter, which includes two seats as opposed to the four seats of FIG. 1. FIG. 2 also shows in more detail an exemplary tail assembly 100, and a bed 90 that supports the tail assembly 100.

Embodiments are intended to include or otherwise cover any type of tail assembly 100 that includes any one or number of elements. For example, the tail assembly 100 may be a single unitarily formed element, or alternatively can be formed of separate components that are connected together. Still further, the tail assembly 100 can be a hybrid of these embodiments.

The tail assembly 100 can include a tail light 30. Some embodiments only include a single tail light 30, while other embodiments include multiple tail lights 30, such as a pair of tail lights 30 that are symmetrically arranged with respect to other vehicle components. Embodiments are intended to include or otherwise cover any known, related art, or later developed type of tail lights 30 that may be detectable by other vehicles and/or pedestrians, including but not limited to light emitting diodes (LED's), incandescent bulbs, halogen lights, laser on phosphorous, etc.

The exemplary tail assembly 100 of FIG. 2 includes tail light covers 40, which may be formed of any type of material to facilitate use in a desired application. In some embodiments, the tail light covers 40 are formed of plastic, and/or any other rugged, light weight composite material capable of withstanding an off-road environment of an all-terrain or off-highway all-terrain vehicle. The tail light 30 and tail light cover 40 form an elongated structure spanning vertically along the transverse and vertical axes of the vehicle 10.

The exemplary tail assembly 100 of FIG. 2 also includes an over fender 60 that forms a surface above the rear wheels 16L, 16R, and that is at least partially responsible for deterring or otherwise impeding debris, such as dust, mud, etc., from entering the vehicle 10 during operation. The over fender 60 can be positioned at an angle relative to the terrain on which the vehicle is traveling and away from the transverse axis of the vehicle 10, such as at an angle of 20°, 45°, etc.

The exemplary tail assembly 100 of FIG. 2 also includes a fender 50 that covers and/or reinforces the over fender 60, and that is independently attached to the over fender 60 and the bed 90, as discussed in much more detail below. These elements are connected together so that the fender 50 extends beyond the over fender 60 and embraces the over fender 60 to increase the support along the longitudinal axis of the vehicle. The exemplary tail assembly 100 of FIG. 2 also includes assembly components 160, such as brake lights, reflectors, storage batteries, etc., as well as body panels 120 disposed below the assembly components 160.

Figure 3:
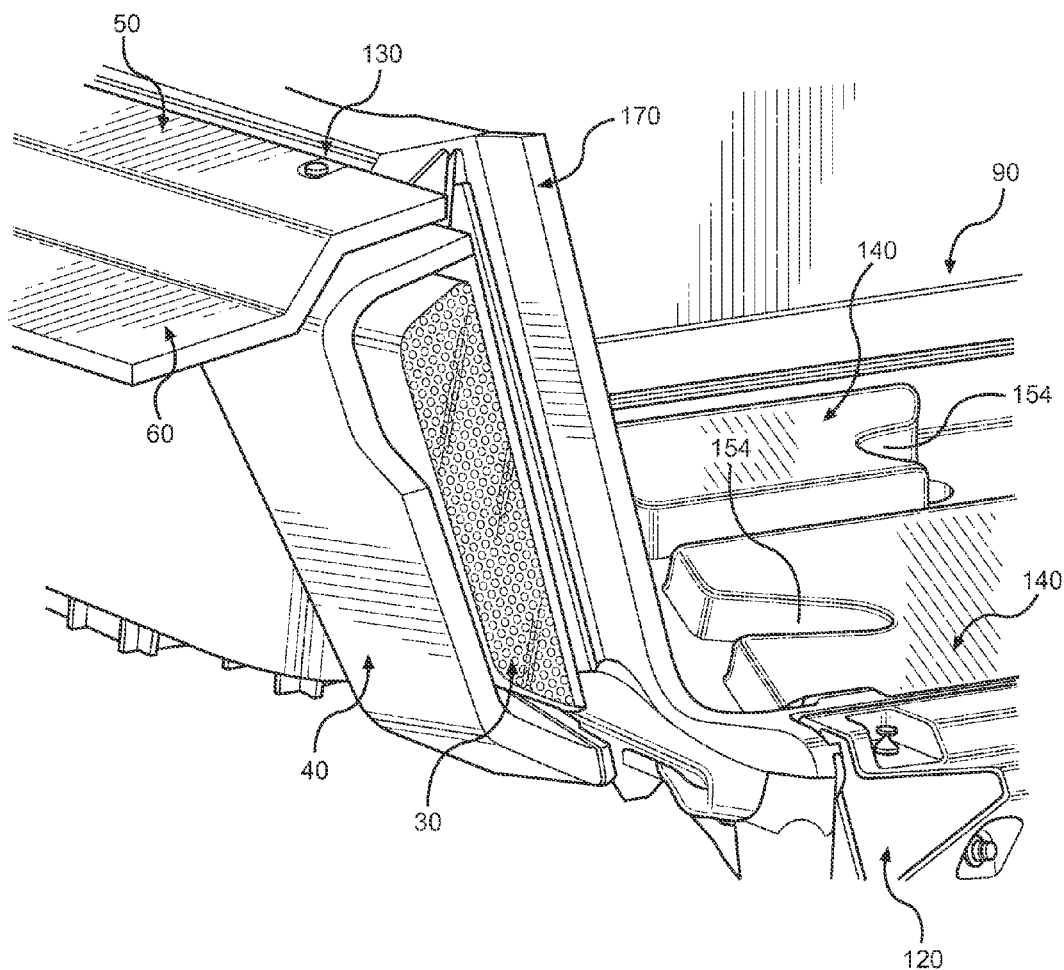
FIG. 3 is a rear perspective view of an exemplary tail assembly and bed of the vehicles of FIGS. 1 and 2.
Figure 4:
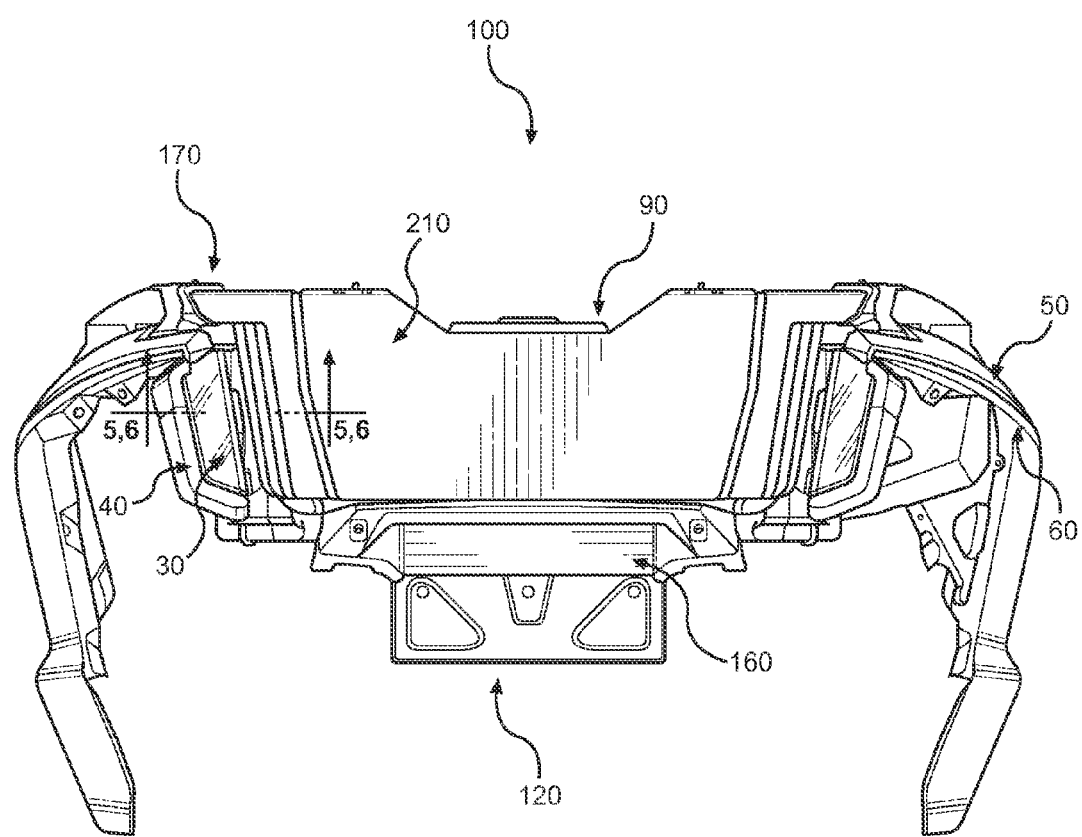
FIG. 4 is a front perspective view of the exemplary tail assembly and bed of FIG. 3.

FIG. 3 is a rear perspective view of an exemplary tail assembly and bed of the vehicles of FIGS. 1 and 2; and FIG. 4 is a front perspective view of the exemplary tail assembly and bed of FIG. 3. As shown in these figures, the fender 50 and over fender 60 are positioned so as to curve over the rear wheels 16L and 16R.

FIG. 3 specifically illustrates the tail assembly 100, bed 90 with raised contours 140, tail light 30, tail light cover 40, fender 50, over fender 60 and body panel 120. The raised contours 140 can be formed unitarily with the bed 90, and can be formed of molded plastic. The raised contours 140 can be formed to increase the ruggedness of the bed 90 to assist in the stabilization of the tail assembly 100, and in particular to facilitate supporting at least the tail light 30 and fender 50 (and possibly also supporting various ancillary components, such as the tail light cover 40, etc.).

Embodiments are intended to include any structure to perform the above function. In other words, the configuration of the raised contours 140 may vary depending on the vehicle, application, budget restrictions, weight requirements, assembly specifications, factory capabilities, etc.

As shown in FIG. 3, a rear compartment of the vehicle is defined in part by the bed 90 and a sidewall 170 of bed 90. The bed 90 defines the bottom of the rear compartment, and its sides are defined by the sidewall 170 of bed 90.

Figure 5:
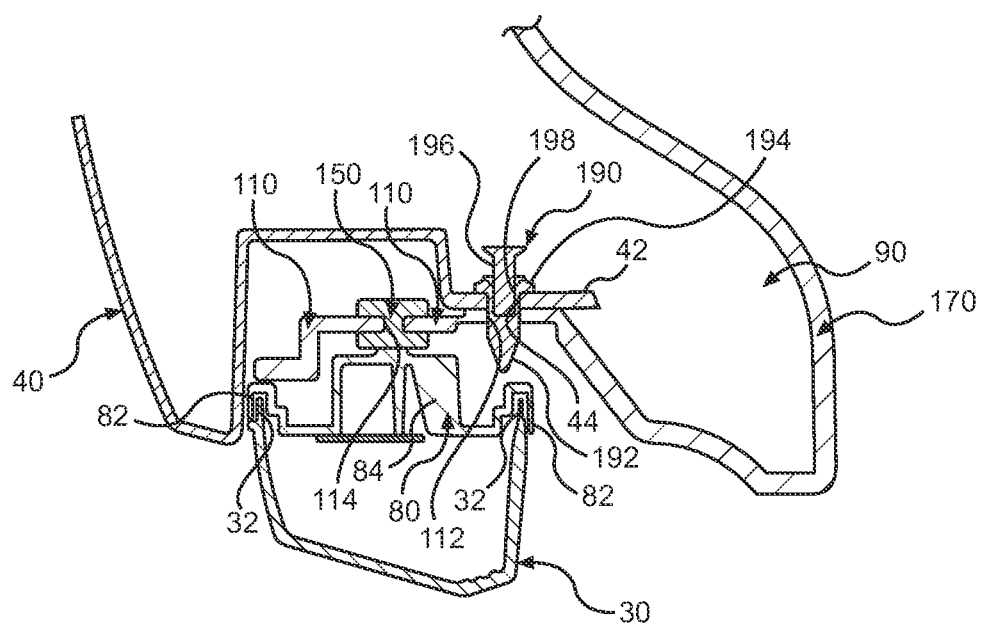
FIG. 5 is a cross-sectional view taken along line 5-5 of FIG. 4, and shows a plug and tail light housing for connecting an exemplary tail light to the bed of FIGS. 3 and 4.
Figure 6:
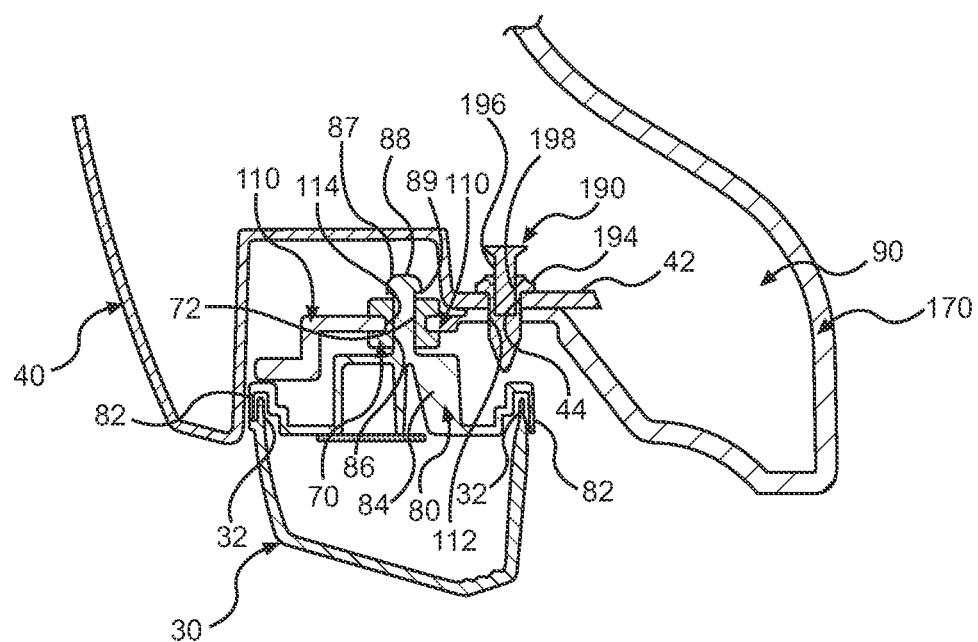
FIG. 6 is a cross-sectional view taken along line 6-6 of FIG. 4, and shows a socket and tail light housing for connecting an exemplary tail light to the bed of FIGS. 3 and 4.
Figure 8:
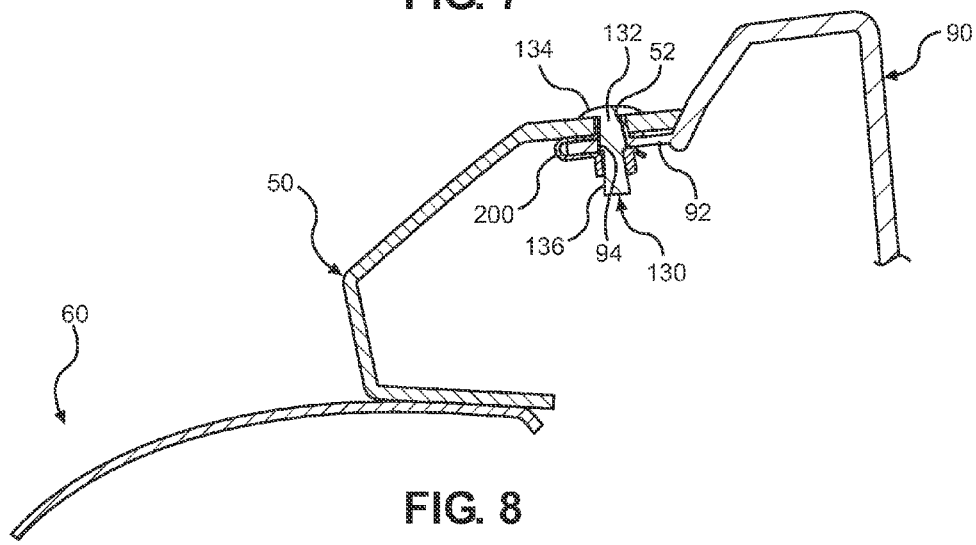
FIG. 8 is a cross-sectional view taken along line 8-8 of FIG. 7, and shows an exemplary apparatus for connecting an exemplary fender to the bed of FIGS. 3 and 4.

The sidewall 170 of bed 90 can either be unitarily formed with the bed 90, or alternatively directly or indirectly connected thereto. As shown in FIGS. 5 and 6, the tail light 30 and tail light cover 40 are connected to the sidewall 170 of the bed 90. As shown in FIG. 8, the fender 50 and over fender 60 are connected to the sidewall 170 of the bed 90. These connections between the sidewall 170 of bed 90, bed 90, tail light 30, tail light cover 40, fender 50, and over fender 60 are discussed in much more detail in Section IV. Mechanical Connection Embodiments.

FIG. 3 also shows a rear body panel 120. The rear body panel 120 may serve to mount rear reflectors, additional rear lighting, collectors of mud and/or dust, etc. As discussed in more detail below, the bed 90 may be configured to allow for heavier structures to be mounted from the tail assembly 100, allowing the body panel 120 to be heavier than many related art structures, i.e., to support higher quality reflectors, further tail lights, etc.

In addition, FIG. 4 shows a rear mount door 210, which obscures the bed 90 from view in this figure. The rear mount door 210 may be detachable, and generally serves to confine items disposed in an area defined by the bed 90 and the sidewall 170 of bed 90, such as to impede these items from exiting this defined space during vehicle operation. The rear mount door 210 may be formed of any material, and in some embodiments is transparent, translucent, opaque, etc., so as to reduce the obstruction of the bed 90 from view.

III. Bed

As shown in FIGS. 2 and 3, the bed 90 can include a series of raised contours 140, which add a degree of stiffness, rigidity and/or strength to the bed 90, which is contrasted with a related art planar bed that is typically flat and more subject to bending, flexing, etc. under strains occurring during vehicle movement. These stresses can be caused by the vehicular speed, landscape differentials, etc., and can cause related art beds to crack, fragment, etc., especially if the bed were to support other vehicular components, i.e., fender, tail lights, etc.

Because the bed 90 has been reinforced with the raised contours 140 as discussed above, it is sufficiently strong to support the weight of the sidewall 170 of bed 90, which can thereby bear the weight of the fender 50 and the tail lights 30. Thus, the bed 90 may lend a portion of its strength to the sidewall 170 of bed 90, which may then defer the influence of forces imparted during vehicle operation, such as from speed bumps, rocky terrain, vegetation, sand dunes, water hazards, etc.

A. Overall Raised Contour Formation

The raised contours 140 in the bed 90 may be formed of any ruggedized material that is sufficiently sturdy to maintain rigidity during at least off-road vehicular motion to support a given weight payload. For example, the raised contours 140 can be unitarily or integrally formed with the bed 90 of rigid plastic via any known, related art or later developed technique, such pressurized molding, sonic welding, or any other fabrication technique capable of integrally or unitarily forming raised contours 140 from an otherwise planar bed. Contrarily, the bed 90 can be formed separately from the raised contours 140 and attached thereto.

Other embodiments include beds 90 that are strengthened in techniques other than via raised contours 140. In other words, the bed 90 of some embodiments does not include any raised contours 140, and instead is strengthened in other ways, such as via elastic deformation. For example, in some embodiments, the bed 90 may be elastically warped or otherwise deformed and fit (such as via pressure fitting) into the sidewall 170 of bed 90.

The bed 90 may be formed to not exceed a certain upper limit so as to enhance fuel consumption, etc. In one embodiment, the weight of bed 90 does not exceed 8 kg.

The bed 90 may be secured to any relevant vehicle component. For example, in some embodiments, the bed 90 is attached to any component of the vehicle frame. This connection can be accomplished via any technique, such as via mechanical fasteners (e.g., nut and bolt assemblies), welding or sonic welding between parts, snap-on plastic mounting or plastic fastening devices, etc. Still further, the parts that provide the connection may be formed integrally or unitarily by any number of plastic molding techniques, such as rotational molding, injection molding, blow molding, compression molding, or any other molding technique as would be familiar with one skilled in the art.

As indicated above, the bed 90 can alternatively be equipped with non-unitary external supporting structures that form the raised contours 140 and that are attached to the bed 90. This attachment can be achieved by any of the aforementioned techniques (such as rivets, nuts and bolts, plastic fasteners, sonic welding or the like). The external structures can also be made of light weight plastic or composite materials capable of reinforcing the bed 90 with a strength sufficient to support the vehicle components discussed above.

B. Raised Contour Geometry and Materials

Figure 7:
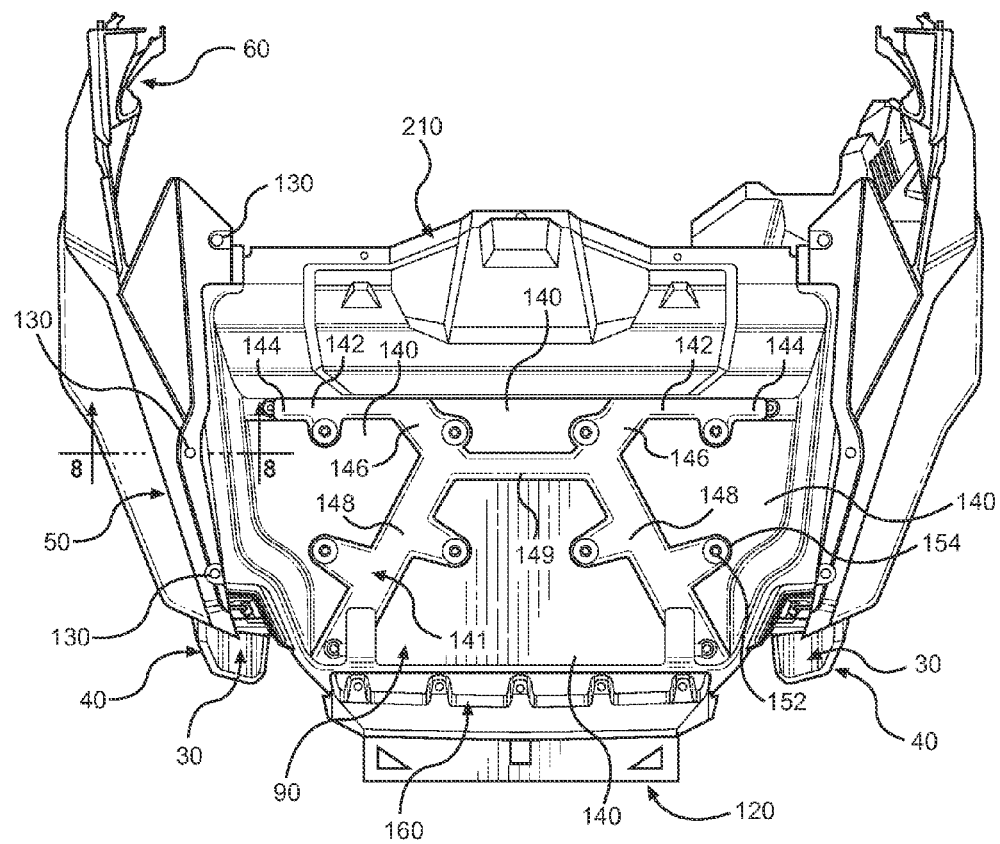
FIG. 7 is an upper perspective view of an exemplary bed that includes contours of the vehicles of FIGS. 1 and 2.

The raised contours 140 are shown in various of the figures, such as FIGS. 2, 3 and 7. For example, FIG. 7 is an upper perspective view of an exemplary bed that specifically shows the raised contours 140 as extending along all four quadrants of the bed 90. The geometry of the raised contours 140 is discussed in more detail below.

As shown in FIG. 7, the raised contours 140 include four separate raised contours 140 that are separated by channels 141, which in part define the perimeter of each of the raised contours 140. In the embodiment of FIG. 7, the four contours include a smallest sized contour at a front end of the bed 90, a largest sized contour at a rear end of the bed 90, and two mid-sized symmetrically shaped contours at opposite sides of the bed 90.

As indicated above, the raised contours 140 are in part defined and separated by channels 141, which include sections 142 that extend in a transverse direction along a surface of the bed 90 adjacent the passenger compartment. Outer ends 144 of the transverse sections 142 are disposed adjacent opposite front corners of the bed 90. Inner ends 146 of the transverse sections are disposed adjacent front ends of longitudinal sections 148. Rear ends of the longitudinal sections 148 are disposed adjacent opposite rear corners of the bed 90. A transversely extending connector 149 is disposed between the longitudinal sections 148, and its ends are each disposed adjacent one of the inner ends 146 of the transverse sections 142.

As indicated above, embodiments are intended to include or otherwise cover raised contours 140 having any structure or shape. For example, all of the raised contours can have a uniform cross-section. Alternatively, the raised contours 140 may vary in cross-sectional height (i.e., along the vertical axis of the vehicle 10).

The bed 90 and raised contours 140 can be formed of any appropriate material, such as reinforced plastic, e.g., a class of materials in which the low modulus and temperature limitations of a plastic is overcome by reinforcing the plastic with fibers of high modulus. This material is discussed in more detail below.

Reinforced plastics, also known as polymer-matrix composite (PMC) and fiber reinforced plastics (FRP), include fibers (the discontinuous or dispersed, phase) in a polymer matrix (the composition phase). These fibers are strong and stiff, and have high specific strength (strength-to-weight ratio) and specific stiffness (stiffness-to-weight ratio). In addition, reinforced-plastic structures have enhanced fatigue resistance, greater toughness and higher creep resistance than those made of a traditional plastic.

The network of raised contours 140 in the tail assembly 100 shown in FIG. 7 achieves this task by virtue of the fact that stressed/re-enforced plastics may achieve an increased strength and rigidity, allowing the bed 90 to support an increased weight payload, including at least a fender and tail lights. Some materials suitable for the composition of these reinforced plastics may come from the polyethylene family, and may include cross-linked polyethylene (PEX), low-density polyethylene (LDPE), linear low-density polyethylene (LLDPE), high-density polyethylene (HDPE), and regrind. Other compounds include PVC plastisols, nylons, and polypropylene. In order of common usage, the materials currently most commonly used in industry are Polyethylene, Polypropylene, Polyvinyl chloride, Nylon, and Polycarbonate. Additionally, a number of other materials may also be used, such as Aluminum, Acrylonitrile butadiene styrene (ABS), Acetal, Acrylic, Epoxy, Fluorocarbons, Ionomer, Polybutylene, Polyester, Polystyrene, Polyurethane, and Silicone.

FIG. 7 also shows multiple connectors 152 that are used to connect the bed 90 to another vehicle component disposed beneath the bed 90, such as a member of the vehicle frame. The connectors 152 can each be constituted as any suitable connector, such as a bolt (for connecting with a nut), rivet, screw, etc., and can include other components to enhance the connection, such as washers, etc. Each of the connectors can be disposed in the channels 141, and in particular in sections of the channels 141 that are defined by arcuate concavities 154 of the raised contours 140. Disposing the connectors 152 in the arcuate concavities 154 may be beneficial, such as by protecting or otherwise securing the connectors 152.

Embodiments are intended to include or otherwise cover any type of connector or any technique for connecting the bed 90 to the vehicle 10, such as to the vehicle frame. For example, as indicated above, any type of mechanical connector can be used, or alternatively some embodiments use other types of connection techniques, such as glue, epoxy, etc.

C. Molding Techniques

Methods of producing the materials disclosed above may include any number of known, related art, or later developed processes. Two exemplary processes are injection molding and pressure fitting, which are discussed below for exemplary purposes.

In injection molding, a vehicle component (such as the bed 90) may be produced by injecting material, such as plastic, into a mold. Injection molding can be performed with numerous materials, including metals, glasses, elastomers, confections, and most commonly thermoplastic and thermosetting polymers, such as the plastics that are disclosed above for use in the bed 90. Material for the part is fed into a heated barrel, mixed, and forced into a mold cavity, where it cools and hardens to the configuration of the cavity. After a product is designed, molds are made from metal, usually either steel or aluminum, and precision-machined to form the features of the desired part. Advances in 3D printing technology, using photopolymers which do not melt during the injection molding of some lower temperature thermoplastics, can be used for some simple injection molds.

Parts to be injection molded can be very carefully designed to facilitate the molding process, and the material used for the part, the desired shape and features of the part, the material of the mold, and the properties of the molding machine may all be taken into account. The versatility of injection molding is facilitated by this breadth of design considerations and possibilities.

During injection molding, a ram or screw-type plunger may be employed to force molten plastic material into a mold cavity; this solidifies into a shape that has conformed to the contour of the mold. This may be used to process both thermoplastic and thermosetting polymers, as may be used to form bed 90.

Thermoplastics may have characteristics that make them highly suitable for injection molding, such as the ease with which they may be recycled, their versatility allowing them to be used in a wide variety of applications, and their ability to soften and flow upon heating. Thermoplastics also have an element of safety over thermosets; if a thermosetting polymer is not ejected from the injection barrel in a timely manner, chemical crosslinking may occur, causing the screw and check valves to seize, which may potentially damage the injection molding machine.

Injection molding includes high pressure injection of the raw material into a mold, which shapes the polymer into the desired shape. Molds can be of a single cavity or multiple cavities. In multiple cavity molds, each cavity can be identical and form the same parts, or alternatively can be unique and form multiple different geometries during a single cycle. Molds are generally made from tool steels, but stainless steels and aluminum molds are suitable for certain applications. Aluminum molds typically are ill-suited for high volume production or parts with narrow dimensional tolerances, because they have inferior mechanical properties and are more prone to wear, damage, and deformation during the injection and clamping cycles; but are cost-effective in low-volume applications because mold fabrication costs and time are considerably reduced.

When thermoplastics, such as may be used in the production of the bed 90, are molded, pelletized raw material can be fed through a hopper into a heated barrel with a reciprocating screw. Upon entrance to the barrel, the thermal energy increases and the Van der Waals forces that resist relative flow of individual chains are weakened as a result of increased space between molecules at higher thermal energy states. This process reduces its viscosity, which enables the polymer to flow with the driving force of the injection unit. The screw delivers the raw material forward, mixes and homogenizes the thermal and viscous distributions of the polymer, and reduces the required heating time by mechanically shearing the material and adding a significant amount of frictional heating to the polymer.

The material feeds forward through a check valve and collects at the front of the screw into a volume known as a shot. A shot is the volume of material that is used to fill the mold cavity, compensate for shrinkage, and provide a cushion (approximately 10% of the total shot volume, which remains in the barrel and prevents the screw from bottoming out) to transfer pressure from the screw to the mold cavity. When enough material has gathered, the material is forced at high pressure and velocity into the part forming cavity. To reduce, impede or prevent spikes in pressure, the process can use a transfer position corresponding to a 95-98% full cavity, where the screw shifts from a constant velocity to a constant pressure control. Injection times can be under 1 second. Once the screw reaches the transfer position, the packing pressure is applied, which completes mold filling and compensates for thermal shrinkage, which is quite high for thermoplastics relative to many other materials. The packing pressure is applied until the gate (cavity entrance) solidifies. Due to its small size, the gate can be the first place to solidify through its entire thickness. Once the gate solidifies, no more material may enter the cavity; accordingly, the screw reciprocates and acquires material for the next cycle, while the material within the mold cools so that it can be ejected and be dimensionally stable. This cooling duration is dramatically reduced by the use of cooling lines circulating water or oil from a thermolator. Once the required temperature has been achieved, the mold opens, and an array of pins, sleeves, strippers, etc., are driven forward to demold the article. Then, the mold closes and the process is repeated.

Pressure fitting (or pressure forming or molding), which may alternatively be used, is a more advanced process used to form plastic sheets into a finely detailed molded shape. The process may utilize a single-sided mold to create the formed shape using vacuum & pressure on opposing sides of the sheet. In normal vacuum forming, the forming force may be limited to, for example, 14.7 psi of atmospheric pressure. However, because pressure forming utilizes both vacuum and positive air pressure, the process can generate 3 to 4 times the forming pressure of a vacuum alone. As a result, fine details may be formed in the plastic sheet that create a mold side appearance similar to that of an injection molded part, including surface textures, and can be fabricated at a fraction of the tooling price. This detail includes such features as molded-in textures, tight corners, ribbing, embossed wording & logos, etc.

Pressure forming has several advantages over other processes, such as injection molding. Some of these advantages are: lower tooling costs, highly cost effective for low to medium volume runs, faster to market with quick prototypes, cost effective for larger parts, pressure formed parts of dimensions up to at least 48"×96" or greater, etc.

Another technique of fabricating the raised contours includes rotational plastic molding. Rotational molding (also known as BrE molding) involves a heated hollow mold, which is filled with a charge or shot weight of material. It is then slowly rotated (such as around two perpendicular axes), causing the softened material to disperse and stick to the walls of the mold. In order to maintain even thickness throughout the part, the mold continues to rotate at all times during the heating phase, and to avoid sagging or deformation also during the cooling phase.

Molds (or tooling) can be either fabricated from welded sheet steel or cast. The fabrication method can be driven by part size and complexity; the most intricate parts are more beneficially made out of cast tooling. Molds can be manufactured from stainless steel or aluminum. Aluminum molds can be much thicker than an equivalent steel mold, as it is a softer metal. This thickness does not affect cycle times significantly because aluminum's thermal conductivity is many times greater than steel. Due to the need to develop a model prior to casting, cast molds may have additional costs associated with the manufacturing of the tooling, whereas fabricated steel or aluminum molds, particularly when used for less complex parts, can be less expensive. However, the molds may contain both aluminum and steel. This can allow for variable thicknesses in the walls of the product. While this process is not as precise as injection molding, it does provide the designer with more options. The aluminum addition to the steel provides more heat capacity, causing the melt-flow to stay in a fluid state for a longer period.

IV. Mechanical Connection Embodiments

FIG. 5 is a cross-sectional view taken along line 5-5 of FIG. 4, and specifically shows one potential embodiment of the mechanical connection between the tail light 30, tail light cover 40, and side wall 170 of the bed 90.

As shown in FIG. 5, the sidewall 170 of bed 90 defines a lateral perimeter of the bed 90, and includes mating supports 110 that facilitate connection to the tail light 30 and tail light cover 40. Mating supports 110 are specifically formed as a section of the sidewall 170 of bed 90 that extends in proximity to the tail light 30 and tail light cover 40.

One section of the mating supports 110 defines a first aperture 112 adjacent a first portion 42 of the tail light cover 40. The first portion 42 of the tail light cover 40 defines a coaxial aperture 44 that is coaxial with the first aperture 112.

The coaxial aperture 44 is contiguous with the first aperture 112 such that a secondary connector 190 extends through both apertures 44 and 112. The secondary connector 190 may be formed of any material sufficient to perform the function disclosed below, including but not limited to plastic, metal, ceramic, or a composite material, and may be any acceptable device, such as a clip, and have any acceptable structure, such as being threaded or unthreaded, and may support screws, rivets, plastic connectors, etc.

In particular, an outer portion 192 extends through both apertures 44 and 112 and contacts the surfaces defining the apertures. A head section 194 of the outer portion 192 of the secondary connector 190 is disposed above the coaxial aperture 44 and contacts an upper surface of the first portion 42 of the tail light cover 40.

The secondary connector 190 also includes an inner portion 196 that is extendable within a channel 198 of the outer portion 192. In particular, extending a shaft of the inner portion 196 within the channel 198 of the outer portion 192 causes the secondary connector 190 to be secured in place. A head of the inner portion 196 is disposed at a top end of the shaft, and defines a diameter that is greater than a diameter of the channel 198, which prevents or impedes its entry into the channel 198. Impeding entry into the channel 198 may be beneficial by enhancing the ability to remove the secondary connector 190 from the apertures 44 and 112.

Another section of the mating supports 110 of sidewall 170 of bed 90 defines a second aperture 114 adjacent a portion of the tail light 30, and in particular adjacent a tail light housing 80 that is attached to the tail light 30. In particular, the tail light housing 80 includes symmetrical end sections 82 that communicate with corresponding tip portions 32 of the tail light 30 to secure the tail light housing harness 80. The tip portions 32 are pressure fitted to the end sections 82, such as to form "snaps" to secure these elements together. The tail light housing 80 can be unitarily formed or alternatively formed of multiple separate elements and can be formed of any acceptable material.

The tail light housing 80 also includes a central portion 84 that is disposed between the end sections 82. The central portion 84 communicates with a plug 150, which is rigidly secured to the outer section of the mounting supports 110 at the second aperture 114, so as to secure the tail light housing 80 (and thereby the tail light 30) to the sidewall 170 of bed 90. The plug 150 can be secured to the central portion 84 and the mating supports 110 by any technique, such as by glue, epoxy, welding, sonic welding, etc. The plug 150 can also be formed of any material that is able to perform the disclosed attachment, such as rubber, plastic, etc. and may be a single unitarily formed structure, or alternatively may be formed of multiple separate elements that are connected together. In other words, the plug 150 may be formed of any material with sufficient strength to connect the tail light assembly to the bed 90, such as of rubber, plastic, or any number of composite materials. The plug 150 is disposed in between and connected to the mating supports 110 and the tail light housing 80 by any acceptable technique.

The plug 150 seals the second aperture 114 and is rigidly disposed at the section of the mating supports 110 adjacent to and defining the second aperture 114. The central portion 84 of the tail light housing 80 is rigidly connected to the plug 150, and thus is thereby indirectly connected to the mounting supports 110 of the sidewall 170 of bed 90. The tail light 30 is thereby indirectly connected to the sidewall 170 of bed 90 by virtue of its connection to the central portion 84 of the tail light housing 80.

The above structures for connecting the tail light 30 and tail light cover 40 to the mounting supports 110 of the sidewall 170 of bed 90 are merely provided for exemplary purposes, and embodiments are intended to include or otherwise cover any apparatus and techniques for connecting these elements, including but not limited to the other mechanical connection techniques. For example, other embodiments connect these elements by glue, epoxy, welding etc. Still further, other embodiments form some or all of these elements unitarily.

In fact, FIG. 6 is a cross sectional view taken along line 6-6 of FIG. 4, and specifically illustrates an alternative between the tail light 30, tail light cover 40, sidewall 170 of bed 90, mating supports 110, tail light housing 80, and rubber mounting 70. The alternative embodiment shown in FIG. 6 includes the same structure as shown in FIG. 5, except that it replaces the plug 150 and tail light housing 80 of FIG. 5 with alternative structures. Thus, the embodiment of FIG. 6 connects the sidewall 170 of bed 90 to the tail light cover 40 using the same structure shown in FIG. 5, but provides an alternative structure for connecting the tail light 30.

In particular, the embodiment of FIG. 6 replaces the plug 150 of FIG. 5 with a rubber mounting 70 structure (also referred to as a socket). The rubber mounting 70 is rigidly connected to the other mating support 110 at and around the second aperture 114. This technique for securing the rubber mounting 70 to the mating support can be the same or different from the technique used to connect the plug 150 to the mating support 110.

The embodiment of FIG. 6 differs from the FIG. 5 embodiment in the manner of attachment between the rubber mounting 70 and the central portion 84 of the tail light housing 80. Specifically, the rubber mounting 70 defines a channel 72 through which a housing shaft 86 extends. The housing shaft 86 is integral with central portion 84 of the tail light housing 80, and a housing head 88 is defined at a tip end of the housing shaft 86. Thus, the rubber mounting 70 defines a channel 72 or hole through its center, which allows the rubber donut shaped structure to collapse as it is assembled. The housing head 88 is inserted into the channel 72 in this donut shaped structure, and the assembly is not able to disassemble because the donut cannot collapse.

A diameter of the housing head 88 is greater than a diameter of the channel 72 to thereby impede entry into the channel 72. In particular, the housing head 88 defines an arcuate or curved upper surface 87 and a linear camming surface 89. These surfaces enable the housing shaft 86 to enter a lower end of the channel 72 and pass through the channel 72 in a upwardly direction in the context of FIG. 6. Specifically, the curved upper surface 87 of the housing head 88 enables the housing shaft 86 to enter and pass through the channel 72, while offering some resistance to such entry and travel. However, once the housing head 88 passes through the upper end of the channel 72, the linear camming surface 89 impedes or prevents reentry of the housing head 88 into the channel 72, thereby securing the central portion 84 of the tail light housing 80 to the rubber mounting 70.

Although FIG. 6 shows one alternative embodiment to the structure of FIG. 5, embodiments are intended to include or otherwise cover any structures or techniques for attaching the components disclosed above. As one such embodiment, the male and female connections disclosed above can be reversed. In still other embodiments, all or some of the disclosed components can be unitary.

As another example, the tail light housing 80 may be manufactured to "Snap-On" into its housing, and may be designed in one piece, which extends in each of the longitudinal, transverse and horizontal dimensions of the vehicle for enhanced or maximum support. The tail light housing 80 may be attached mechanically by snapping into place, or may be attached by any other number of methods, such as gluing, sonic welding, pressure fitting, or the like. To provide flexibility, the tail light housing 80 may be constrained by the mating supports 110 by the rubber mounting 70 to provide a certain degree of movement and flexibility during vehicle operation, while continuing to support the connection between the tail light housing 80 and the tail light 30, tail light cover 40, and the sidewall 170 of bed 90.

FIG. 8 is a cross-sectional view taken along line 8-8 of FIG. 7, and specifically illustrates the connection between fender 50 and the sidewall 170 of the bed 90. As discussed in detail below, mating connector 130 attaches a portion of fender 50 to a portion of the sidewall 170 of the bed 90 that extends underneath fender 50, although in some embodiments the fender 50 may run underneath the sidewall 170 of the bed 90. The mating connector 130 may be composed of plastic and may be formed integrally to reduce cost and weight. However, mating connector 130 may alternatively be formed of any other material, such as metal, ceramic, rubber, other plastics, etc.

As shown in FIG. 8, the mating connector 130 includes a bolt shoulder 132 that extends within a channel 52 defined in the fender 50. A head 134 of the mating connector 130 is disposed at the tip end of the bolt shoulder 132, and a threaded area 136 of the bolt shoulder 132 extends beneath the bolt shoulder 132. A diameter of the head 134 is larger than a diameter of the channel 52 to impede or prevent entry into the channel 52.

A connecting extension 92 of the sidewall 170 of the bed 90 extends beneath a section of the fender 50 that defines the channel 52. The connecting extension 92 defines a bed channel 94 that is contiguous with the channel 52 of the fender 50. In fact, the threaded area 136 of the bolt shoulder 132 of the mating connector 130 also extends through the bed channel 94. Thus, the bolt shoulder 132 extends through both channels 52 and 94.

A retaining clip 200 is provided to secure the mating connector 130 within the channel 52 of the fender 50 and the bed channel 94 of the sidewall 170 of the bed 90. The threaded area 136 of the mating connector 130 communicates with a lower nut area of the retaining clip 200 to secure the elements together. However, the retaining clip 200 can be removed to enable disassembly of the compartments.

V. Operation

As discussed above, the fender 50 is connected to the sidewall 170 of the bed 90 (as shown in FIG. 8), and the tail light 30 and tail light cover 40 are attached to the sidewall 170 of bed 90. The elements enabling these connections can be formed of lightweight materials. Thus, the disclosed methods and apparatus obviate attaching the fender 50, tail light 30, and tail light cover 40 to a metal vehicle frame, such as via metal attachment components. Further, the bed 90 can be formed of a light weight but sufficiently rigid material to support the fender 50, tail light 30, and tail light cover 40. This structure simplifies assembly of the vehicle, and further reduces the weight of the vehicle.

In other words, the integrally formed plastic connection between the fender 50, tail lights 30, and body 90 obviates using metal brackets and/or pipes to secure the fender and/or tail lights. As the vehicle encounters terrain obstacles, the raised contours of the bed 90 add strength and rigidity to the bed 90 adding sufficient strength to support the weight of at least the fender 50 and tail lights 30, and may further strengthen tail assembly 100 with sufficiency to support other vehicular components.

Some of the advantages of this approach include a decrease in weight of the bed 90, which may lead to a decrease in fuel cost and product shipping costs. A lighter bed 90 may also result in an elongated lifetime, an increased cargo capacity, etc. Additionally, this approach may be effective for reducing the weight of the bed 90 to a target weight of 8 kg or less. As previously mentioned, the reduced complexity also allows for a technician to mount the tail assembly without the need for accessing both planes of the assembly surface. This advantage is due to the connector of tail light housing 80 that, may Snap-On, and can reduce the complexity, weight, and part count necessary to construct vehicle 10.

The raised contours 140 help to enable this structure by enhancing the strength of the bed 90. The contours 140 may be formed in any shape based on the spatial constraints of the bed 90, and the vehicle assembly requirements, intended function, factory capabilities and budget, etc. As previously stated, the raised contours 140 may be formed during the molding of the plastic bed, but they may alternatively be installed secondarily and could be formed from other materials. In fact, the raised contours 140 may be composed of any material, such as metal, ceramics, plastics, or the like.

VI. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

Various embodiments are disclosed above for connecting the sidewall 170 of bed 90 to the tail light 30 and tail light cover 40, and for connecting the bed 90 to the fender 50. However, embodiments are intended to include or otherwise cover any methods or apparatus for performing this attachment. For example, any methods or apparatus can be used that enable attend to the bed 90 and cargo frame (as opposed to the vehicle frame) such as via non-metal components.

In addition, various bed 90 structures and compositions are disclosed above. However, embodiments are intended to include or otherwise cover any type of bed that enables support of the vehicle components disclosed above.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicle bed system for use with a vehicle that includes a cargo compartment, a tail light, a tail light cover, and a fender, the vehicle bed system comprising:
    a bed bottom that defines a bottom surface of the vehicle cargo compartment;
    a pair of bed sidewalls that are disposed at opposite sides of the bed bottom, one of the bed sidewalls including a support section that defines a first aperture that is disposed to be contiguous with a corresponding second aperture defined in the tail light cover; and
    connectors that directly connect each of the fender, tail light, and tail light cover to one of the bed sidewalls, the connectors including a first connector that extends through the first and second apertures to thereby directly connect the one bed sidewall to the tail light cover.

2. The vehicle bed system according to claim 1, wherein the bed sidewalls and the bed bottom are unitarily formed.

3. The vehicle bed system according to claim 1, wherein the bed bottom includes raised contours that extend into the cargo compartment and are configured to enhance strength of the bed bottom to enable the bed bottom to support the bed sidewalls, fender, tail light, and tail light cover.

4. The vehicle bed system according to claim 1, wherein the first connector includes an outer portion that directly contacts surfaces of the support section and the tail light cover that define the first and second apertures, and an inner portion that extends within a channel defined in the outer portion, the inner and outer portions being configured such that extending the inner portion deeper into the channel of the outer portion increases a contact force between the outer portion and the surfaces of the support section and the tail light cover that define the first and second apertures.

5. The vehicle bed system according to claim 1, further including a tail light housing connected to the tail light, wherein one of the bed sidewalls includes a support section that defines a third aperture, and the connectors include a plug that is connected to the support section at the third aperture and to the tail light housing to thereby connect the tail light housing to the one bed sidewall.

6. The vehicle bed system according to claim 5, wherein the tail light housing includes opposing end sections that are configured to snap-fit to corresponding opposing tip portions of the tail light to thereby connect the tail light to the tail light housing.

7. The vehicle bed system according to claim 1, further including a tail light housing connected to the tail light, wherein one of the bed sidewalls includes a support section that defines a third aperture, and the connectors include a socket that is connected to the support section at the third aperture.

8. The vehicle bed system according to claim 7, wherein the socket defines a channel that extends from a top end to a bottom end, and the tail light housing defines a shaft that extends through the channel, the tail light housing also defining a head at a tip end of the shaft that has a diameter that is greater than a diameter of the channel.

9. The vehicle bed system according to claim 8, wherein one of the bed sidewalls includes a connecting extension that defines a fourth aperture, the fender defines a fifth aperture that is contiguous with the fourth aperture, and the connectors include a shaft that extends through the fourth and fifth apertures as well as a head that has a diameter that is larger than a diameter of each of the fourth and fifth apertures, the connectors also including a retaining clip that retains the shaft within the fourth and fifth apertures to thereby directly connect the one bed sidewall to the fender.

10. A vehicle assembly for use with a vehicle that includes a cargo compartment, the vehicle assembly comprising:
    an assembly of vehicle components that are exposed to an exterior of the vehicle, the assembly of vehicle components including a tail light, a tail light cover, and a fender;
    a bed bottom that defines a bottom surface of the vehicle cargo compartment;
    a pair of bed sidewalls that are disposed at opposite sides of the bed bottom, one of the bed sidewalls including a support section that defines a first aperture that is disposed to be contiguous with a corresponding second aperture defined in the tail light cover; and
    connectors that directly connect each of the fender, tail light, and tail light cover to one of the bed sidewalls, the connectors including a first connector that extends through the first and second apertures to thereby directly connect the one bed sidewall to the tail light cover.

11. The vehicle assembly according to claim 10, wherein the bed sidewalls and the bed bottom are unitarily formed.

12. The vehicle assembly according to claim 10, wherein the bed bottom includes raised contours that extend into the cargo compartment and are configured to enhance strength of the bed bottom to enable the bed bottom to support the bed sidewalls, fender, tail light, and tail light cover.

13. The vehicle assembly according to claim 10, wherein the first connector includes an outer portion that directly contacts surfaces of the support section and the tail light cover that define the first and second apertures, and an inner portion that extends within a channel defined in the outer portion, the inner and outer portions being configured such that extending the inner portion deeper into the channel of the outer portion increases a contact force between the outer portion and the surfaces of the support section and the tail light cover that define the first and second apertures.

14. The vehicle assembly according to claim 10, further including a tail light housing connected to the tail light, wherein one of the bed sidewalls includes a support section that defines a third aperture, and the connectors include a plug that is connected to the support section at the third aperture and to the tail light housing to thereby connect the tail light housing to the one bed sidewall.

15. The vehicle assembly according to claim 14, wherein the tail light housing includes opposing end sections that are configured to snap-fit to corresponding opposing tip portions of the tail light to thereby connect the tail light to the tail light housing.

16. The vehicle assembly according to claim 10, further including a tail light housing connected to the tail light, wherein one of the bed sidewalls includes a support section that defines a third aperture, and the connectors include a socket that is connected to the support section at the third aperture.

17. The vehicle assembly according to claim 16, wherein the socket defines a channel that extends from a top end to a bottom end, and the tail light housing defines a shaft that extends through the channel, the tail light housing also defining a head at a tip end of the shaft that has a diameter that is greater than a diameter of the channel; and wherein one of the bed sidewalls includes a connecting extension that defines a fourth aperture, the fender defines a fifth aperture that is contiguous with the fourth aperture, and the connectors include a shaft that extends through the fourth and fifth apertures as well as a head that has a diameter that is larger than a diameter of each of the fourth and fifth apertures, the connectors also including a retaining clip that retains the shaft within the fourth and fifth apertures to thereby directly connect the one bed sidewall to the fender.

18. A method of assembling a vehicle bed system for use with a vehicle that includes a cargo compartment, a tail light, a tail light cover, and a fender, the method comprising:
defining a bottom surface of the vehicle cargo compartment with a bed bottom;
disposing a pair of bed sidewalls at opposite sides of the bed bottom;
defining a first aperture with a support section of one of the bed sidewalls;
defining a corresponding second aperture in the tail light cover;
disposing the second aperture to be contiguous with the first aperture; and
directly connecting each of the fender, tail light, and tail light cover to one of the bed sidewalls by extending a first connector through the first and second apertures.

* * * * *